United States Patent
Choi et al.

(10) Patent No.: US 11,448,939 B2
(45) Date of Patent: Sep. 20, 2022

(54) EFFICIENT SPECTRUM-SPANNING TERAHERTZ FREQUENCY SYNTHESIS VIA DIELECTRIC STRUCTURE WITH NONLINEAR MEDIUM

(71) Applicant: Massachusetts Institute of Technology, Cambridge, MA (US)

(72) Inventors: Hyeongrak Choi, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/384,861

(22) Filed: Jul. 26, 2021

(65) Prior Publication Data

US 2022/0091474 A1    Mar. 24, 2022

Related U.S. Application Data

(60) Provisional application No. 63/082,771, filed on Sep. 24, 2020.

(51) Int. Cl.
*G02F 1/39* (2006.01)
*G02F 1/35* (2006.01)
(Continued)

(52) U.S. Cl.
CPC ............ *G02F 1/392* (2021.01); *G02F 1/3503* (2021.01); *G02F 1/3551* (2013.01); *G02F 1/37* (2013.01);
(Continued)

(58) Field of Classification Search
CPC ........ G02F 1/3503; G02F 1/3551; G02F 1/37; G02F 1/392; G02F 2202/32; G02F 2203/13
See application file for complete search history.

(56) References Cited

U.S. PATENT DOCUMENTS 5,400,173 A * 3/1995 Komine ............... G02F 1/39
359/326
2014/0362880 A1* 12/2014 Chuang ............... H01S 3/0092
372/22

(Continued)

FOREIGN PATENT DOCUMENTS

CN    109739061 A  *  5/2019

OTHER PUBLICATIONS

Mayer et al., "Far-infrared nonlinear optics. I. χ (2) near ionic resonance." Physical Review B 33.10 (1986): 6954. 8 pages.

(Continued)

*Primary Examiner* — Daniel Petkovsek
(74) *Attorney, Agent, or Firm* — Smith Baluch LLP

(57) ABSTRACT

It remains a challenge to generate coherent radiation in the spectral range of 0.1-10 THz ("the THz gap"), a band for applications ranging from spectroscopy to security and high-speed wireless communications. Here, we disclose how to produce coherent radiation spanning the THz gap using efficient second-harmonic generation (SHG) in low-loss dielectric structures, starting from an electronic oscillator (EO) that generates coherent radiation at frequencies of about 100 GHz. The EO is coupled to cascaded, hybrid THz-band dielectric cavities that combine (1) extreme field concentration in high-quality-factor resonators with (2) nonlinear materials enhanced by phonon resonances. These cavities convert the input radiation into higher-frequency coherent radiation at conversion efficiencies of $>10^3$%/W, making it possible to bridge the THz gap with 1 W of input power. This approach enables efficient, cascaded parametric frequency converters, representing a new generation of light sources extensible into the mid-IR spectrum and beyond.

19 Claims, 16 Drawing Sheets

(51) Int. Cl.
  *G02F 1/37* (2006.01)
  *G02F 1/355* (2006.01)
(52) U.S. Cl.
  CPC ...... *G02F 2202/32* (2013.01); *G02F 2203/13* (2013.01)

(56) References Cited

U.S. PATENT DOCUMENTS

| | | | |
|---|---|---|---|
| 2016/0099540 A1* | 4/2016 | Chuang | H01S 3/10084 372/5 |
| 2016/0357088 A1* | 12/2016 | McKinstrie | H01S 3/0078 |
| 2017/0269455 A1* | 9/2017 | Kaertner | G02F 1/3558 |

OTHER PUBLICATIONS

Notomi et al., "Nanowire photonics toward wide wavelength range and subwavelength confinement." Optical Materials Express 10.10 (2020): 2560-2596.
Paarmann et al., "Second harmonic generation spectroscopy in the Reststrahl band of SiC using an infrared free-electron laser." Applied Physics Letters 107.8 (2015): 081101. 5 pages.
Perkowitz, "Navigating the terahertz gap." Physics World 33.3 (2020): 37. 5 pages.
Petersen et al., "Efficient parametric terahertz generation in quasi-phase-matched GaP through cavity enhanced difference-frequency generation." Applied physics letters 98.12 (2011): 121119. 4 pages.
Reshef et al., "Nonlinear optical effects in epsilon-near-zero media." Nature Reviews Materials 4.8 (2019): 535-551.
Roelli et al., "Molecular platform for frequency upconversion at the single-photon level." Physical Review X 10.3 (2020): 031057. 14 pages.
Sengupta et al., "Terahertz integrated electronic and hybrid electronic-photonic systems." Nature Electronics 1.12 (2018): 622-635.
Tonouchi, "Cutting-edge terahertz technology." Nature Photonics 1.2 (2007): 97-105.
Trusheim et al., "A Polariton-Stabilized Spin Clock." arXiv preprint arXiv:2009.02427 (2020). 6 pages.
Urteaga et al., "InP HBT technologies for THz integrated circuits." Proceedings of the IEEE 105.6 (2017): 1051-1067.
Vernon et al., "Quantum frequency conversion and strong coupling of photonic modes using four-wave mixing in integrated microresonators." Physical Review A 94.2 (2016): 023810. 12 pages.
Wan et al., "Large-scale integration of artificial atoms in hybrid photonic circuits." Nature 583.7815 (2020): 226-231.
Wetzstein et al., "Inference in artificial intelligence with deep optics and photonics." Nature 588.7836 (2020): 39-47.
Wu et al., "Generation of~ 100 kW narrow-line far-infrared radiation from a KTP off-axis THz parametric oscillator." Optica 6.6 (2019): 723-730.
Yan et al., "High-average-power, high-repetition-rate tunable terahertz difference frequency generation with GaSe crystal pumped by 2 μm dual-wavelength intracavity KTP optical parametric oscillator." Photonics Research 5.2 (2017): 82-87.
Aghasi et al., "Terahertz electronics: Application of wave propagation and nonlinear processes." Applied Physics Reviews 7.2 (2020): 021302. 36 pages.
Ateshian et al., "Terahertz Light Sources by Electronic-Oscillator-Driven Second Harmonic Generation in Extreme-Confinement Cavities." arXiv e-prints (2020): arXiv—2009. v1 posted Sep. 28, 2020, v2 posted Nov. 8, 2020, 16 pages.
Barker et al., "Dielectric properties and optical phonons in LiNbO3." Physical Review 158.2 (1967): 433. 13 pages.
Barker et al., "Infrared Study of the Lattice Vibrations in LiTaO3." Physical Review B 2.10 (1970): 4233. 7 pages.
Barker, "Dielectric dispersion and phonon line shape in gallium phosphide." Physical Review 165.3 (1968): 917. 6 pages.
Barmentlo et al., "Sum-frequency generation with a free-electron laser: A study of gallium phosphide." Physical Review A 50.1 (1994): R14. 4 pages.

Bondaz et al., "Generation and Stabilization of Continuous-Wave THz Emission From a Bi-Color VECSEL." IEEE Photonics Technology Letters 31.19 (2019): 1569-1572.
Buckley et al., "Second harmonic generation in photonic crystal cavities in (111)-oriented GaAs." Applied Physics Letters 103.21 (2013): 211117. 5 pages.
Burgess et al., "Design of an efficient terahertz source using triply resonant nonlinear photonic crystal cavities." Optics express 17.22 (2009): 20099-20108.
Cao et al., "W-Band GaN IMPATT Diodes for High Power Millimeter-Wave Generation." 2019 IEEE National Aerospace and Electronics Conference (NAECON). IEEE, 2019. 4 pages.
Carnio et al., "An Extensive Finite-Difference Time-Domain Formalism for Second-Order Nonlinearities Based on the Faust-Henry Dispersion Model: Application to Terahertz Generation." Journal of Infrared, Millimeter, and Terahertz Waves 41.3 (2020): 291-298.
Carolan et al., "Variational quantum unsampling on a quantum photonic processor." Nature Physics 16.3 (2020): 322-327.
Chevalier et al., "Widely tunable compact terahertz gas lasers." Science 366.6467 (2019): 856-860.
Choi et al., "Cascaded cavities boost the indistinguishability of imperfect quantum emitters." Physical Review Letters 122.18 (2019): 183602. 6 pages.
Choi et al., "Self-similar nanocavity design with ultrasmall mode volume for single-photon nonlinearities." Physical Review Letters 118.22 (2017): 223605. 6 pages.
Dai et al., "Terahertz time-domain spectroscopy characterization of the far-infrared absorption and index of refraction of high-resistivity, float-zone silicon." JOSA B 21.7 (2004): 1379-1386.
Deal et al., "InP HEMT integrated circuits operating above 1,000 GHz." 2016 IEEE International Electron Devices Meeting (IEDM). IEEE, 2016. 4 pages.
Dekorsy et al., "Infrared-phonon-polariton resonance of the nonlinear susceptibility in GaAs." Physical Review Letters 90.5 (2003): 055508. 4 pages.
Faust et al., "Dispersion in the nonlinear susceptibility of GaP near the reststrahl band." Physical Review 173.3 (1968): 781. 6 pages.
Faust et al., "Mixing of visible and near-resonance infrared light in GaP." Physical Review Letters 17.25 (1966): 1265. 4 pages.
Flytzanis et al., "Second-order optical susceptibilities of III-V semiconductors." Physical Review 178.3 (1969): 1218. 11 pages.
Fujita et al., "Recent progress in terahertz difference-frequency quantum cascade laser sources." Nanophotonics 7.11 (2018): 1795-1817.
Garrett, "Nonlinear optics, anharmonic oscillators, and pyroelectricity." IEEE Journal of Quantum Electronics 4.3 (1968): 70-84.
Grischkowsky et al., "Far-infrared time-domain spectroscopy with terahertz beams of dielectrics and semiconductors." JOSA B 7.10 (1990): 2006-2015.
Guo et al., "Second-harmonic generation in aluminum nitride microrings with 2500%/W conversion efficiency." Optica 3.10 (2016): 1126-1131.
Hafez et al., "Terahertz nonlinear optics of graphene: from saturable absorption to high-harmonics generation." Advanced Optical Materials 8.3 (2020): 1900771. 25 pages.
Han et al., "Filling the gap: Silicon terahertz integrated circuits offer our best bet." IEEE Microwave Magazine 20.4 (2019): 80-93.
Harris et al., "Linear programmable nanophotonic processors." Optica 5.12 (2018): 1623-1631.
Hattori et al., "Indices of refraction of ZnS, ZnSe, ZnTe, CdS, and CdTe in the far infrared." Optics Communications 7.3 (1973): 229-232.
Heuck et al., "Controlled-phase gate using dynamically coupled cavities and optical nonlinearities." Physical Review Letters 124.16 (2020): 160501. 6 pages.
Heuck et al., "Photon-photon interactions in dynamically coupled cavities." Physical Review A 101.4 (2020): 042322. 24 pages.
Hirori et al., "Single-cycle terahertz pulses with amplitudes exceeding 1 MV/cm generated by optical rectification in LiNbO 3." Applied Physics Letters 98.9 (2011): 091106. 4 pages.
Hu et al., "Design of photonic crystal cavities for extreme light concentration." ACS Photonics 3.9 (2016): 1647-1653.

(56) References Cited

OTHER PUBLICATIONS

Hu et al., "High-power radiation at 1 THz in silicon: A fully scalable array using a multi-functional radiating mesh structure." IEEE Journal of Solid-State Circuits 53.5 (2018): 1313-1327.
Izumi et al., "Resonant-tunneling-diode terahertz oscillator with a cylindrical cavity for high-frequency oscillation." AIP Advances 9.8 (2019): 085020. 7 pages.
Jin et al., "Phase-locked terahertz plasmonic laser array with 2 W output power in a single spectral mode." Optica 7.6 (2020): 708-715.
Kasagi et al., "Large-scale array of resonant-tunneling-diode terahertz oscillators for high output power at 1 THz." Journal of Applied Physics 125.15 (2019): 151601. 8 pages.
Kojima et al., "Broadband terahertz time-domain spectroscopy of ferroelectric LiTaO 3: Phonon-polariton dispersion." AIP Conference Proceedings. vol. 1627. No. 1 American Institute of Physics, 2014. 7 pages.
Kojima et al., "Dielectric properties of ferroelectric lithium tantalate crystals studied by terahertz time-domain spectroscopy." Japanese Journal of Applied Physics 42.9S (2003): 6238. 5 pages.
Krastanov et al., "Room-temperature photonic logical qubits via second-order nonlinearities." Nature Communications 12.1 (2021): 1-10.
Krupka et al., "High q-factor millimeter-wave silicon resonators." IEEE Transactions on Microwave Theory and Techniques 64.12 (2016): 4149-4154.
Lee et al., "Graphene-based Josephson junction microwave bolometer." Nature 586.7827 (2020): 42-46.
Leong et al., "A 0.85 THz low noise amplifier using InP HEMT transistors." IEEE Microwave and Wireless Components Letters 25.6 (2015): 397-399.
Lewis, "A review of terahertz sources." Journal of Physics D: Applied Physics 47.37 (2014): 374001. 12 pages.
Li et al., "Multi-Watt high-power THz frequency quantum cascade lasers." Electronics Letters 53.12 (2017): 799-800.
Lin et al., "Cavity-enhanced second-harmonic generation via nonlinear-overlap optimization." Optica 3.3 (2016): 233-238.
Liu et al., "Sum-frequency phonon spectroscopy on α-quartz." Physical Review B 78.2 (2008): 024302. 6 pages.
Lu et al., "Ultrahigh Purcell factor, improved sensitivity, and enhanced optical force in dielectric bowtie whispering-gallery-mode resonators." IEEE Photonics Journal 9.5 (2017): 1-10.
Luo et al., "Distributed feedback 2.5-terahertz quantum cascade laser with high-power and single-mode emission." Optical Engineering 59.2 (2020): 026109. 9 pages.
Madsen et al., "Integrated all-pass filters for tunable dispersion and dispersion slope compensation." IEEE Photonics Technology Letters 11.12 (1999): 1623-1625.

\* cited by examiner

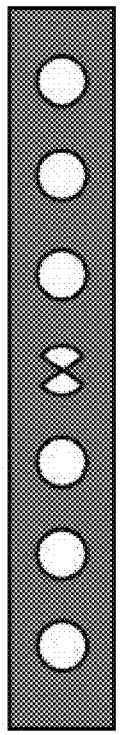
*FIG. 1D*
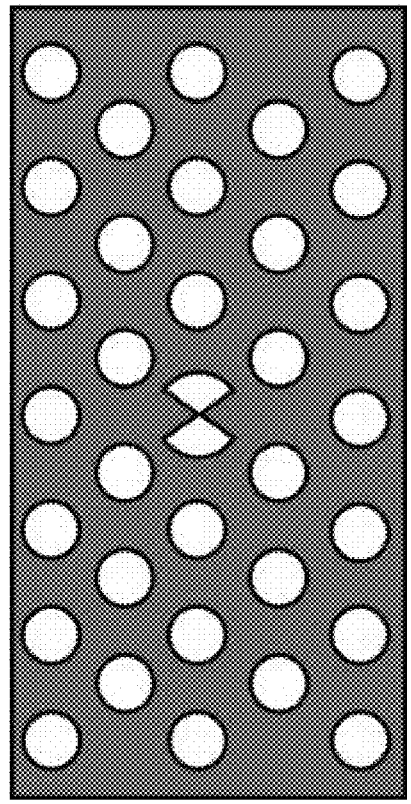
*FIG. 1E*
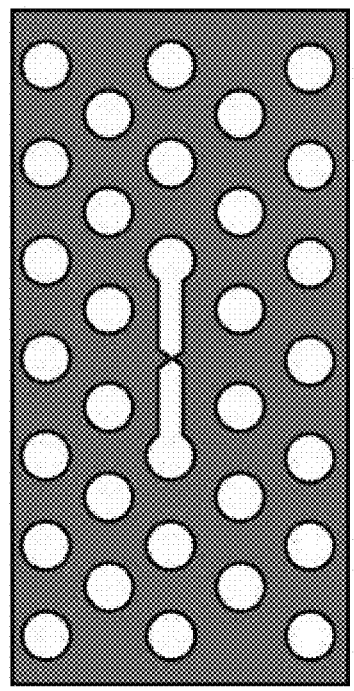
*FIG. 1B*
*FIG. 1C*

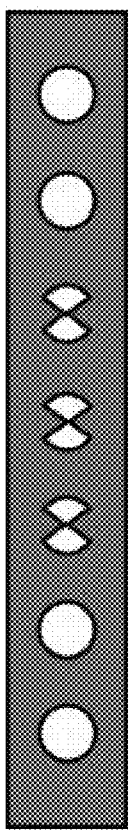
FIG. 1H
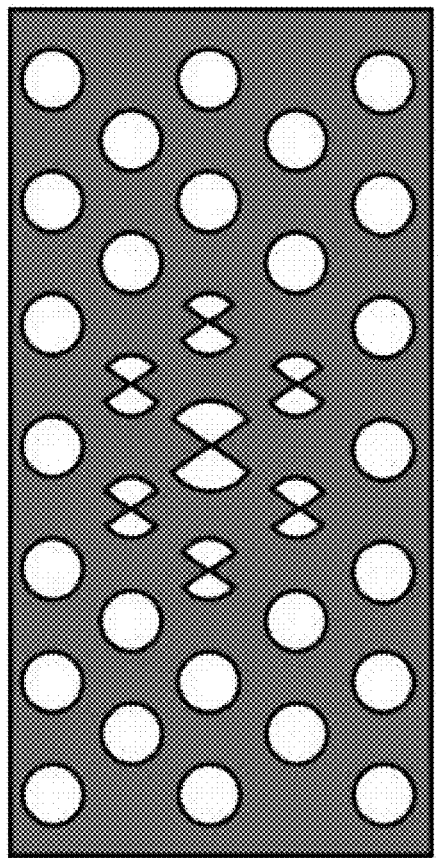
FIG. 1I
FIG. 1F
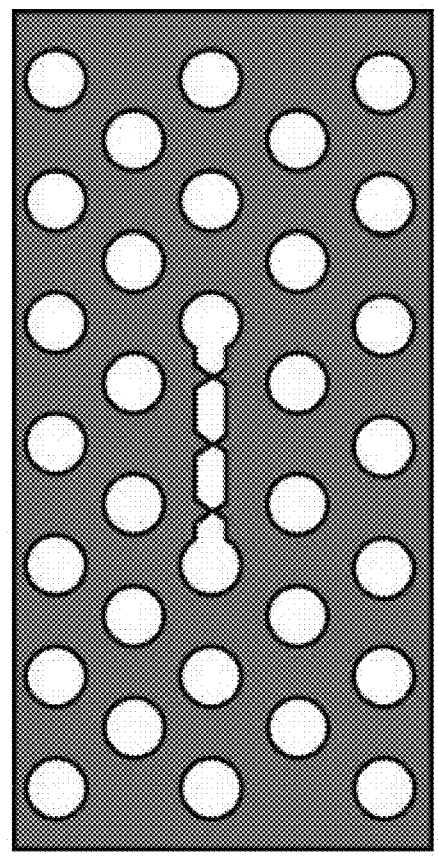
FIG. 1G

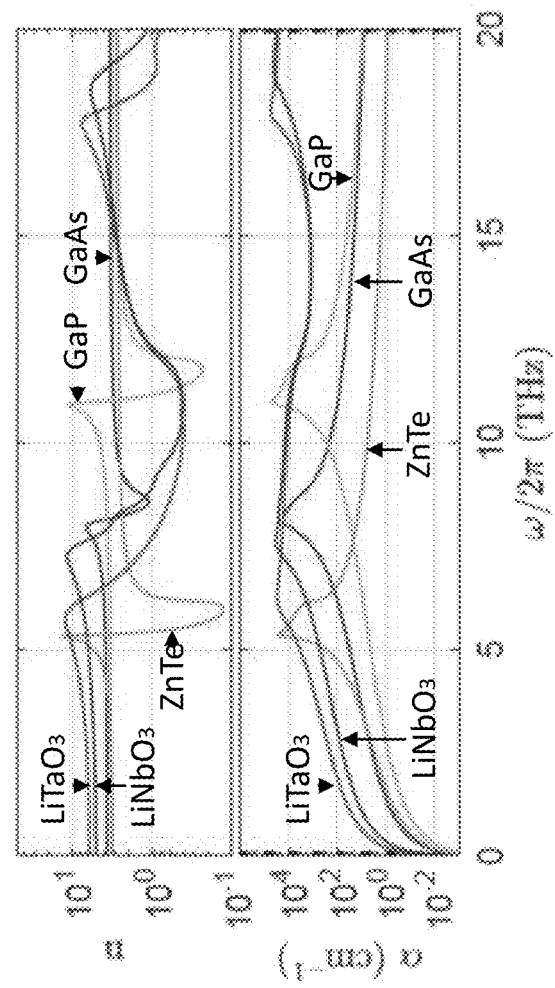

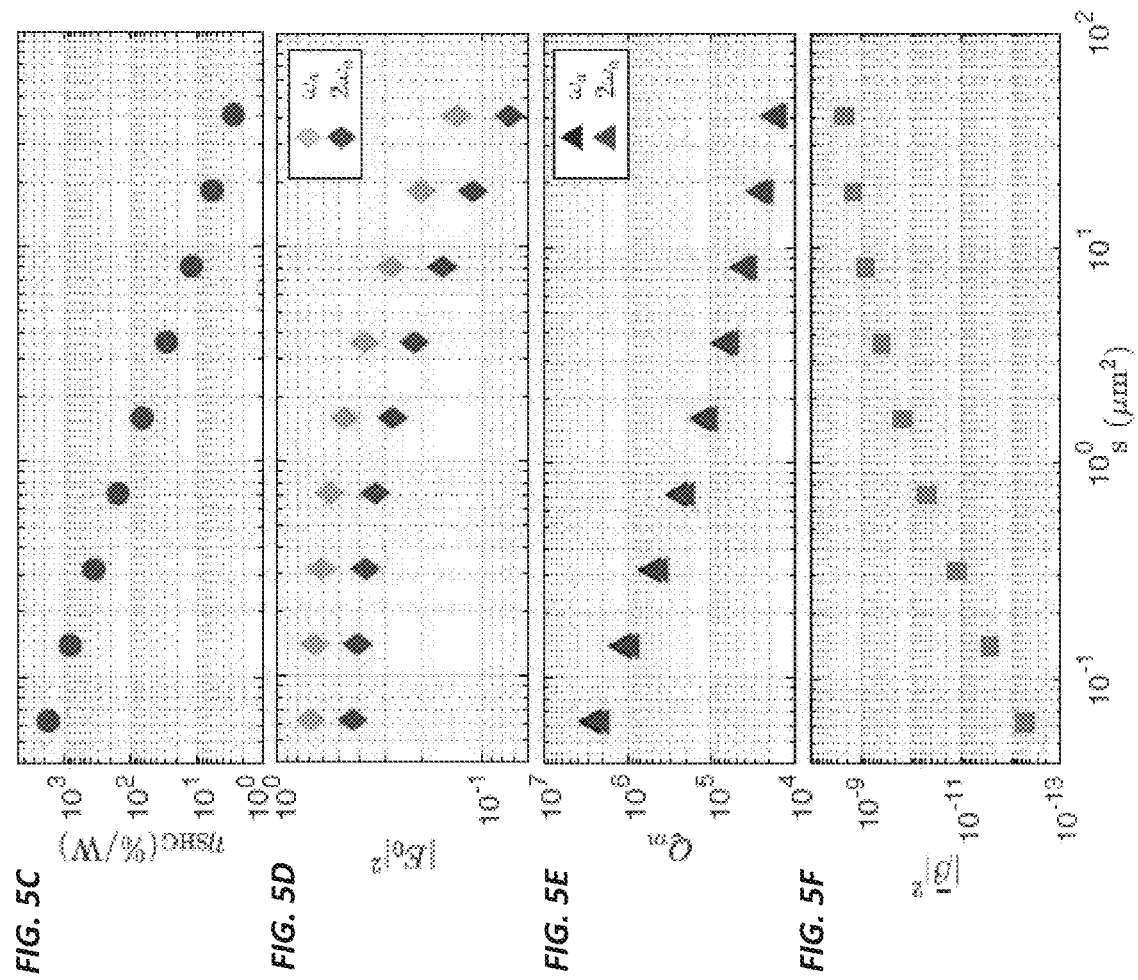

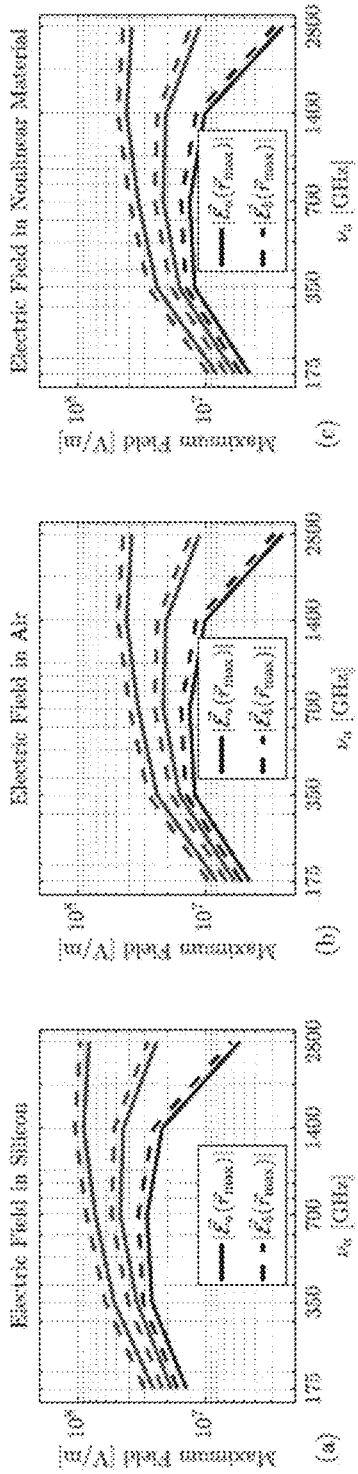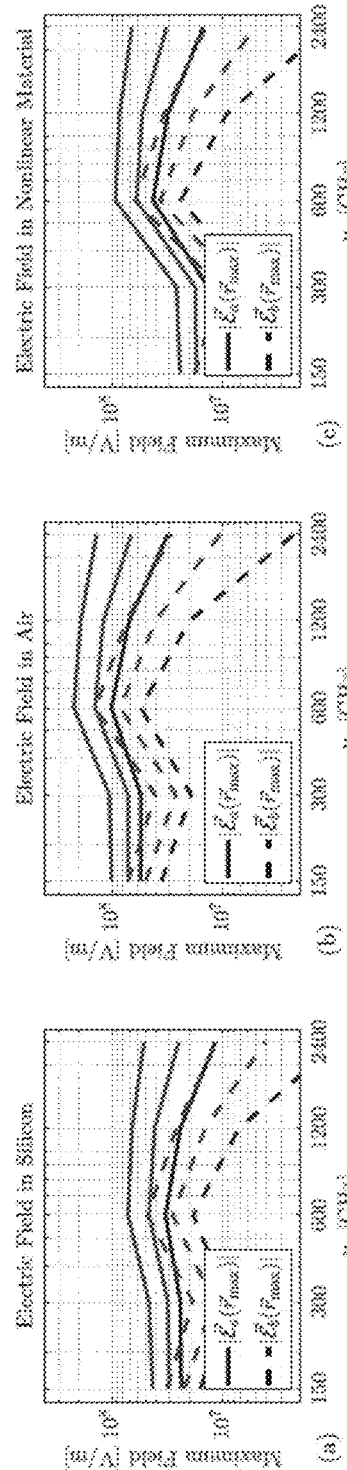
FIG. 11A  FIG. 11B  FIG. 11C
FIG. 12A  FIG. 12B  FIG. 12C

EFFICIENT SPECTRUM-SPANNING TERAHERTZ FREQUENCY SYNTHESIS VIA DIELECTRIC STRUCTURE WITH NONLINEAR MEDIUM

CROSS-REFERENCE TO RELATED APPLICATION(S)

This application claims the priority benefit, under 35 U.S.C. 119(e), of U.S. Application No. 63/082,771, which was filed on Sep. 24, 2020, and is incorporated herein by reference in its entirety for all purposes.

GOVERNMENT SUPPORT

This invention was made with Government support under Grant No. D18AC00014 awarded by the Defense Advanced Research Projects Agency (DARPA). The Government has certain rights in the invention.

BACKGROUND

There are fundamental differences in how frequency-stable electromagnetic (EM) radiation is generated at frequencies $\omega/2\pi \ll 1$ THz and $\omega/2\pi \gg 1$ THz. The majority of sub-THz sources rely on electronic oscillators (EOs) or frequency multipliers. Far above about 10 THz, sources use gain media based on population inversion. Dividing these frequency regimes is the "terahertz gap," commonly defined as 0.1-10 THz, in which efficient, compact, and room-temperature EM sources have been notoriously challenging to build. However, the abundance of opportunities in the THz spectrum for a range of applications—from molecular spectroscopy to remote sensing, navigation, and wireless communication—motivates the development of more efficient sources in this band. Electronic sources based on nonlinear electrical frequency-multipliers and high-frequency oscillators can generated terahertz waves within the terahertz gap, but they operate inefficiently above the maximum oscillation frequency of transistors $f_{max}$—100-300 GHz. On the other hand, terahertz sources derived from population inversion have low efficiencies (e.g., 0.02% for DFG), require cryogenic cooling (e.g., quantum-cascade lasers), or rely on expensive and large ultra-fast lasers.

SUMMARY

Here, we disclose a different approach based on extreme field concentration with high quality factor cavities. Our approach can achieve frequency conversion from about 100 GHz (microwave) into the THz domain with efficiencies exceeding $10^3\%/W$. Our approach opens the door to efficient, phase-stable synthesis of electromagnetic radiation bridging the terahertz gap.

Our approach can be implemented as a frequency synthesis system that includes a series of cascaded parametric converters with a first parametric converter and a second parametric converter fed by the first parametric converter. In operation, the first parametric converter converts a field at a first frequency into a field at a second frequency higher than the first frequency. The second parametric converter converts the field at the second frequency into a field at a third frequency higher than the second frequency.

The first parametric converter may include a dielectric cavity simultaneously resonant at the first frequency and the second frequency, a second-order nonlinear material disposed in the dielectric cavity, and a field concentrator. The second-order nonlinear material converts the field at the first frequency into the field at the second frequency. And the field concentrator concentrates the field at the first frequency in the second-order nonlinear material. The dielectric cavity can be a photonic-crystal cavity, in which case the field concentrator comprises a pair of tips formed in the photonic-crystal cavity and the second-order nonlinear material is disposed between the pair of tips. The dielectric cavity can also be a ring resonator comprising a first ring and a second ring on opposite sides of the second-order nonlinear material. In either case, the second-order nonlinear material can have a cross-sectional area of no more than 1 µm².

The third frequency can be double the second frequency, which can be double the first frequency. The third frequency can be at least 0.1 THz.

The frequency synthesis system can also include a signal generator, coupled to the first parametric converter, to generate the field at the first frequency. It can also include a waveguide, in electromagnetic communication with the first and second parametric converters, to couple the field at the second frequency from the first parametric converter to the second parametric converter. In this case, the first parametric converter can comprise a first photonic crystal cavity simultaneously resonant at the first frequency and the second frequency, the second parametric converter can comprise a second photonic crystal cavity simultaneously resonant at the second frequency and the third frequency, and the first parametric converter can comprise a distributed Bragg reflector configured to reflect radiation at the first frequency and to transmit radiation at the second frequency.

The field at the third frequency can be phase-locked to the field at the second frequency and to the field at the first frequency.

The first parametric converter can convert the field at the first frequency into the field at the second frequency higher by generating a second harmonic of the field at the first frequency or by mixing the field at the first frequency with another field.

An alternative system for frequency synthesis includes a series of N cascaded parametric converters. The $n^{th}$ cascaded parametric converter in this series includes a photonic crystal cavity, a second-order nonlinear medium, and a field concentrator. The photonic crystal cavity is simultaneously resonant at a fundamental frequency and a second-harmonic frequency. The second-order nonlinear material, which is disposed in the photonic crystal cavity, convert a field at the fundamental frequency from an $(n-1)^{th}$ cascaded parametric converter in the series of cascaded parametric converters into a field at the second-harmonic frequency that is coupled to an $(n+1)^{th}$ cascaded parametric converter in the series of cascaded parametric converters. And the field concentrator concentrates the field at the fundamental frequency in the second-order nonlinear material.

Generally, N is an integer greater than 2, and n is an integer between 1 and N. For instance, N can be at least 5, in which case n can be 2, 3, 4, or more. An output of the series of N cascaded parametric oscillators can be at a frequency of 100 GHz to 5 THz.

This alternative system can also include a phase-stable electronic oscillator, operably coupled to an input of the series of N cascaded parametric converters, to couple an input wave into the series of N cascaded parametric converters at a frequency of 50-200 GHz.

All combinations of the foregoing concepts and additional concepts discussed in greater detail below (provided such concepts are not mutually inconsistent) are contemplated as being part of the inventive subject matter disclosed herein.

All combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 1B-1I show alternative photonic crystal cavities for use in a terahertz source like the one in FIG. 1A.

FIG. 4A is a plot of the calculated refractive index for different second-order nonlinear media.

FIG. 4B is a plot of the calculated absorption coefficient for different second-order nonlinear media.

FIG. 5C is a plot of the second-harmonic generation (SHG) conversion efficiency versus nonlinear medium cross-sectional area for the ring resonator of FIG. 5B.

FIG. 5D is a plot of the normalized electric field energy in the tip versus nonlinear medium cross-sectional area for the ring resonator of FIG. 5B.

FIG. 5E is a plot of the material quality factor versus nonlinear medium cross-sectional area for the ring resonator of FIG. 5B.

FIG. 5F is a plot of the squared magnitude of the normalized nonlinear overlap versus nonlinear medium cross-sectional area for the ring resonator of FIG. 5B.

FIGS. 11A-11C are plots of the maximum field strength in each of the photonic crystal cavity materials corresponding to the power and intracavity energy levels in FIGS. 7A and 7B.

FIGS. 12A-12C are plots of the maximum field strength in each of the ring cavity materials corresponding to the power and intracavity energy levels in FIGS. 8A and 8B.

DETAILED DESCRIPTION

Figure 1A:
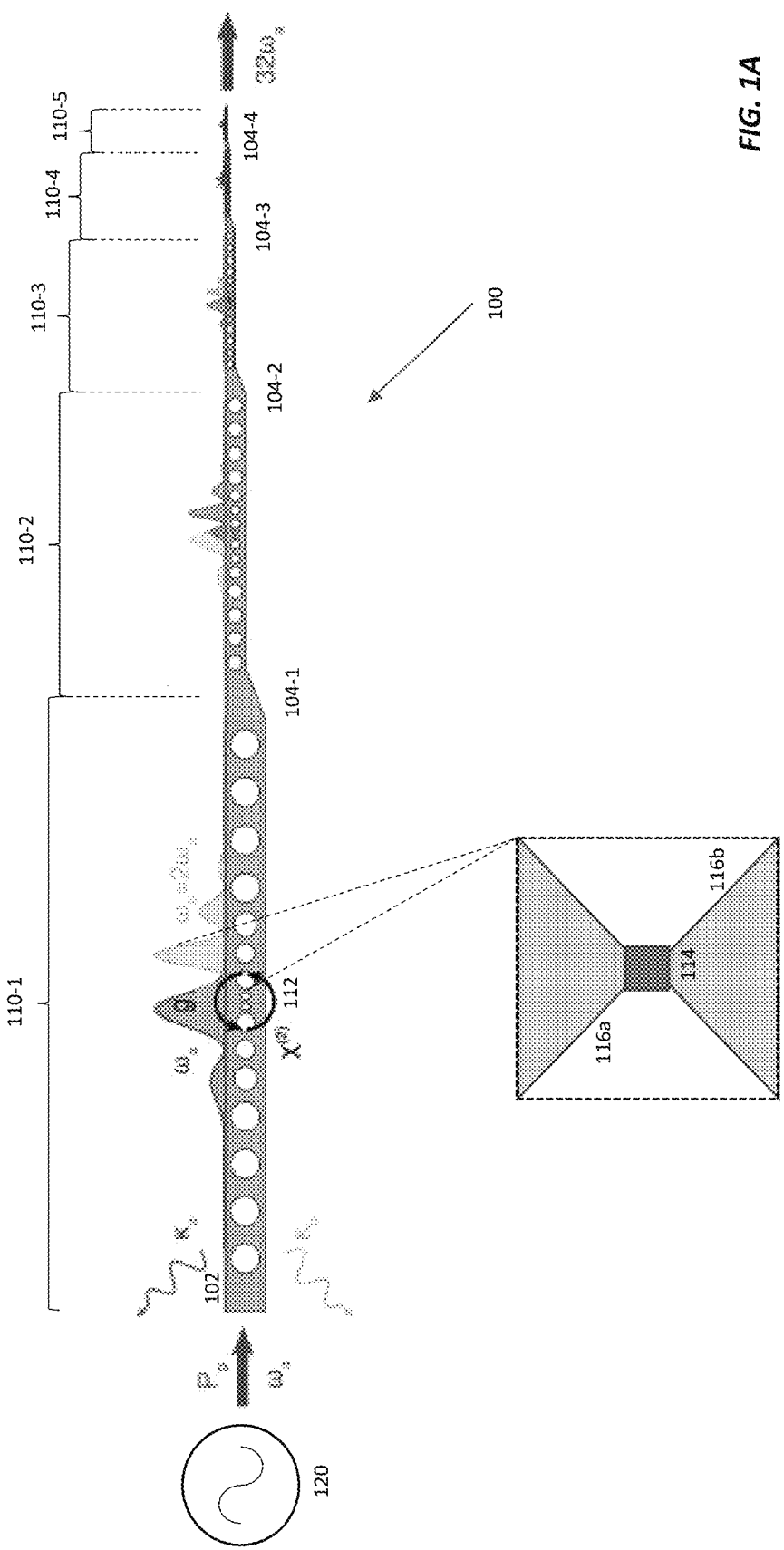
FIG. 1A shows a terahertz frequency synthesizer that includes cascaded photonic-crystal parametric frequency converters with nonlinear material between field-concentrating tips in doubly resonant photonic crystal cavities.

We disclose a new approach for light sources in the THz spectrum based on cascaded second-harmonic generation (SHG) pumped by low-noise electronic oscillators. As opposed to laser sources, this approach does not use population inversion; and in contrast to electronic sources, where ohmic loss limits high-frequency operation, the dominant loss originates from material absorption and radiation. It leverages doubly resonant dielectric resonators with high quality factors and phonon-resonance-enhanced second-order nonlinear materials for parametric frequency conversion, which is power-preserving. Modeling shows that the proposed devices provide sufficiently high SHG conversion efficiency to be cascaded over multiple octaves, provided sufficiently high input power from the electronic source. This approach can also be used with sum/difference frequency generation (SFG/DFG) instead of or in addition to SHG, enabling signal synthesis at arbitrary frequencies. Using a combination of cascaded SHG, SFG, and DFG, our approach enables compact, low-cost, and room temperature devices that deliver high power THz radiation at any frequency in the THz gap, and that may be extended to generate radiation in the mid-infrared (mid-IR) region of the electromagnetic spectrum and beyond.

Unlike a laser, a frequency synthesizer made of cascade parametric converters does not include a gain medium. This eliminates numerous challenges associated with a gain medium, including as quantum noise (spontaneous emission) and technical noise (drive current noise, relaxation oscillations, vibrations, etc.), promising an output with the phase-stability of the electronic seed oscillator. The efficiency of the SHG approach increases with the pump power of the seed oscillator and is only limited by the dielectric breakdown of materials. Because the SHG is "parametric" (which does not dissipate power), our SHG approach mitigates the sharp efficiency drop in electronic sources above fmax due to ohmic losses and parasitic losses of nonlinear reactances.

Each of the cascaded parametric converters in the SHG-based frequency synthesizer includes a cavity that contains or is made of a second-order nonlinear medium and is resonant at both the input (fundamental) frequency and the output (second-order) frequency. The input to the first cascaded parametric converter comes from a phase-stable electronic oscillator; the input to each other cascaded parametric converter is the output of the preceding cascaded parametric converter. Each stage's output is phase-locked to its input, so all the output of the synthesizer is phase-locked to the seed signal, which can be generate with a phase-stable electronic oscillator. At each stage of this parametric SHG cascade process, the input mode a with a power $P_p$ generates a field in an output mode b at twice the frequency with SHG efficiency $\eta_{SHG}$:

$$\eta_{SHG} \equiv \frac{P_{SHG}}{P_p^2} \equiv \frac{64}{\hbar \omega_a^4} g^2 Q_a^2 Q_b \eta_c,$$

where $\eta_c$ is the input-output coupling efficiency, $Q_a$ and $Q_b$ are the quality factors of the fundamental (FD) and second-harmonic (SH) modes, respectively, and g is the nonlinear coupling rate, given by:

$$g \equiv \chi_{eff}^{(2)} \sqrt{\frac{\hbar \omega_a^2 \omega_b}{\epsilon_0}} \frac{\tilde{\beta}}{\sqrt{(\lambda_a / n_a)^3}},$$

where $\chi_{eff}^{(2)}$ is the effective second-order nonlinear coefficient of the nonlinear medium, $n_a$ is the refractive index of the nonlinear medium at $\omega_a$, $\tilde{\beta}$ is the SHG mode overlap between the input and output modes, normalized to the wavelength in the nonlinear medium $\lambda_a$.

Both the frequency of the output mode $\omega_b$ and the wavelength in the nonlinear medium $\lambda_a$ are proportional to frequency of the intput mode $\omega_a$, so the coupling rate g is proportional to $\omega_a^3$. This means that the SHG conversion efficiency $\eta_{SHG}$ is proportional to $\omega_a^2$. The dependence of the conversion efficiency on the frequency squared poses a technical challenge in terahertz SHG compared to its optical counterpart. Fortunately, this scaling can be overcome with a combination of (1) materials with large nonlinear coefficient derived from phonon resonances and (2) cavity designs with strong field confinement. Embedding a material with a large second-order nonlinear response in a region of high field concentration, such as a photonic crystal cavity with dielectric tip structures or a ring resonator, reduces optical loss and increases conversion efficiency.

Calculations of non-depleted and absolute conversion efficiencies of these cascaded parametric-converter frequency synthesizers indicate the feasibility of generating THz radiation from 1 W of input power at substantially higher efficiency than electronic sources alone and without cryogenic cooling. Increasing the input power to up to 4 W at a seed frequency of about 100 GHz. To stay below the damage threshold imposed by dielectric breakdown, larger cavities in the early stages of the cascade may distribute gain or the outputs of multiple cavities/stages can be coherently combined between stages while compensating losses in each step.

Frequency Synthesis with Cascaded Photonic Crystal Parametric Converters

FIGS. 1A-1K illustrate a frequency synthesizer 100 that includes a series of cascaded photonic-crystal parametric converters 110-1 through 110-5, also called parametric conversion stages, driven by an electronic oscillator 120 at an input signal at a frequency $\omega_a$ and a power $P_a$. The input signal frequency $\omega_a$ can range, for example, from 50 GHz to 200 GHz (e.g., 75 GHz, 100 GHz, 125 GHz, 150 GHz, 175 GHz, etc.). The first parametric converter 110-1 converts the input signal into a frequency-doubled output signal at a frequency $\omega_b = 2\omega_a$ that serves as the input to the second parametric converter 110-2, which frequency-doubles the signal again to produce an output at a frequency $\omega_c = 2\omega_b = 4\omega_a$. In this example, there are five cascaded parametric converters, so the output signal is at a frequency $32\omega_a$. More generally, the output frequency for a terahertz source with N stages is $2^N \omega_a$, where N can be 1, 2, 3, 4, 5, 6, 7, 8, or more. The final output frequency can be anywhere from 100 GHz to 5 THz or more, depending on the input frequency $\omega_a$, the number of parametric conversion stages 110, and whether the parametric conversion stages 110 generate second harmonics, difference frequencies, sum frequencies, etc., as described below.

The parametric converters 110 are formed in a dielectric (e.g., silicon) waveguide 102 with adiabatically tapered coupling regions 104-1 through 104-4 that connect respective parametric converters 110-1 through 110-5. Each parametric converter 110 includes a one-dimensional (1D) photonic crystal formed in the dielectric waveguide 102. Photonic crystal cavities have at least two advantages in SHG: (1) they have a small mode volume resulting in increased energy density (SHG is proportional to the intensity squared); and (2) they are phase-matching insensitive because the nonlinear material is only at the center. However, it can be hard to obtain the energy matching condition ($\omega_b = 2\omega_a$) with photonic crystal cavities.

These holes form a distributed Bragg reflector that defines a cavity 112 centered on the central hole that is resonant at both the input (fundamental) frequency ($\omega_a$ for the first parametric converter 110-1) and the output (second-harmonic) frequency ($\omega_b = 2\omega_a$ for the first parametric converter 110-1). The radii of the holes vary with position, with the central hole having the smallest radius. The hole radii taper down, then up from left to right to creates defect modes in the bandgap. The hole sizes and positions are chosen so that the distributed Bragg reflector transmits light at the second-harmonic frequency and reflects light at the fundamental frequency.

The inset (bottom) shows a portion of the central hole in greater detail. A rectangular nanowire made of a second-order nonlinear ($\chi^{(2)}$) material 114 sits between two concentric tips 116a and 116b that protrude into the center of the central hole. These tips 116 concentrate the electric field in the second-order nonlinear material 114, increasing the SHG conversion efficiency. Suitable second-order nonlinear materials 114 include dielectric insulators, semiconductors, superconductors, and metals, particularly those with high nonlinearities originating from ionic, atomic, or phonon resonances (e.g., GaAs, GaP, ZnTe, $LiNbO_3$, $LiTaO_3$, and graphene). Quantum materials such as charge density wave materials ($TaS_2$), excitonic insulators ($Ta_2NiS_5$), and collective excitations in superconductors (NbN) may enable even higher second harmonic efficiency or signal amplification.

Epsilon-near-zero materials (permittivity $c_1$) in the tip would amplify the electric energy density in that material by Ede, which could further boost efficiency. Each parametric converter 110 may include a different nonlinear medium 114; the nonlinear medium 114 for each stage can be selected to provide the highest conversion efficiency possible for that stage's input frequency. For example, $LiNbO_3$ and $LiTaO_3$ are both well-suited for frequency conversion at frequencies at or below 500 GHz, whereas GaP is well-suited for frequency conversion at frequencies at or above 500 GHz. ZnTe and GaAs have the advantage of being easier to make in some cases.

FIGS. 1B-1I illustrate alternative photonic crystal cavity and field-concentrating tips suitable for use in a terahertz source with cascaded parametric converters. FIGS. 1B and 1C show tip-cavity with air slot structures in 1D and 2D photonic crystal cavities, respectively. FIGS. 1D and 1E show tips introduced in air-hole cavities in 1D and 2D photonic crystal cavities, respectively. FIGS. 1F-1I show multi-tip cavities in both air slots and air holes in 1D and 2D photonic crystal cavities.

Figure 1K:
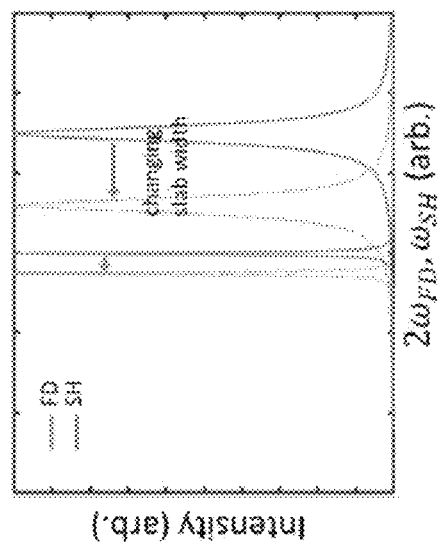
FIG. 1K is a plot illustrating how changes in the photonic crystal slab width change the fundamental (FD) and second-harmonic (SH) resonance frequencies of the photonic crystal cavity in the process of FIG. 1J.
Figure 1J:
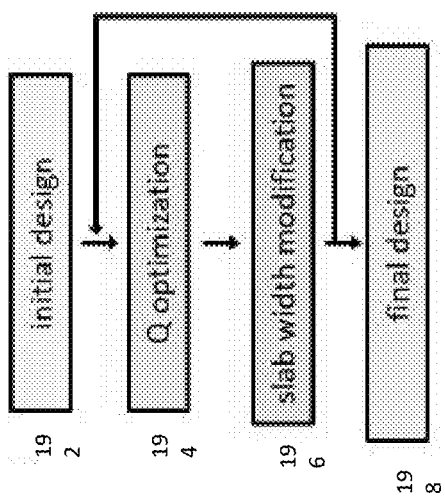
FIG. 1J illustrates a process for designing photonic crystal cavities for use in a terahertz source like the one in FIG. 1A.

FIGS. 1J and 1K illustrate a process 190 for designing a doubly resonant photonic crystal cavity for a terahertz source. For a dielectric defect cavity like the ones shown in FIGS. 1A-1I, where the defect pulls down the air-like mode into the bandgap, there are often higher-order localized modes. This process begins (192) with an initial cavity design with two cavity modes with low quality factors; the cavity modes are near second-harmonic, $\omega_b = 2\omega_a + \delta$, but with large detuning, $\delta > k_a, k_b$. In this case, the conversion efficiency is small due to small quality factors and large detuning. The design process 190 increases both quality factors and reduces the detuning.

In this process 190, the optimization of these three parameters—the two quality factors and the detuning—is decoupled the optimization by separating the parameter space into three. The separation was chosen to be sensitive only to the corresponding condition to be optimized. More specifically, the quality factor $Q_b$ at the second-harmonic frequency $\omega_b$ is optimized by changing the radii and/or positions of the first seven holes on each side of the center hole with the tips (194). The quality factor $Q_a$ at the fundamental frequency $\omega_a$ is optimized by changing the radii and/or positions of outer twenty-five holes. (FIGS. 1A-1I show only a few of these holes.) Out of the twenty-five holes, the latter five have the radii and distances fixed to form Bragg mirrors. The choice of separation is that the fundamental mode is less tightly confined than the second-harmonic one. Thus, the optimization of the fundamental mode does not affect the second-harmonic mode much, if at all. The hole sizes and positions (194) and slab width (196) can be adjusted iteratively until reaching a final design (198) with quality factors and a detuning that fall within acceptable limits.

The detuning is adjusted by changing the slab width (196). The second-harmonic mode can be the third-order waveguide mode in the slab-width direction (for the second-harmonic mode anti-node to be located at the field-concentrating tips). Compared with the fundamental mode (the first-order waveguide mode), the second-harmonic mode is more tightly confined in the transverse direction (larger transverse k-vector). FIG. 1K shows that the resonant frequency of the second-harmonic (SH) mode is more sensitive to the slab width than the resonant frequency of the fundamental (FD) mode: changing the slab width shifts the second-harmonic mode more than the fundamental mode.

Frequency Synthesis with Cascaded Ring Resonator Parametric Converters

Figure 2:
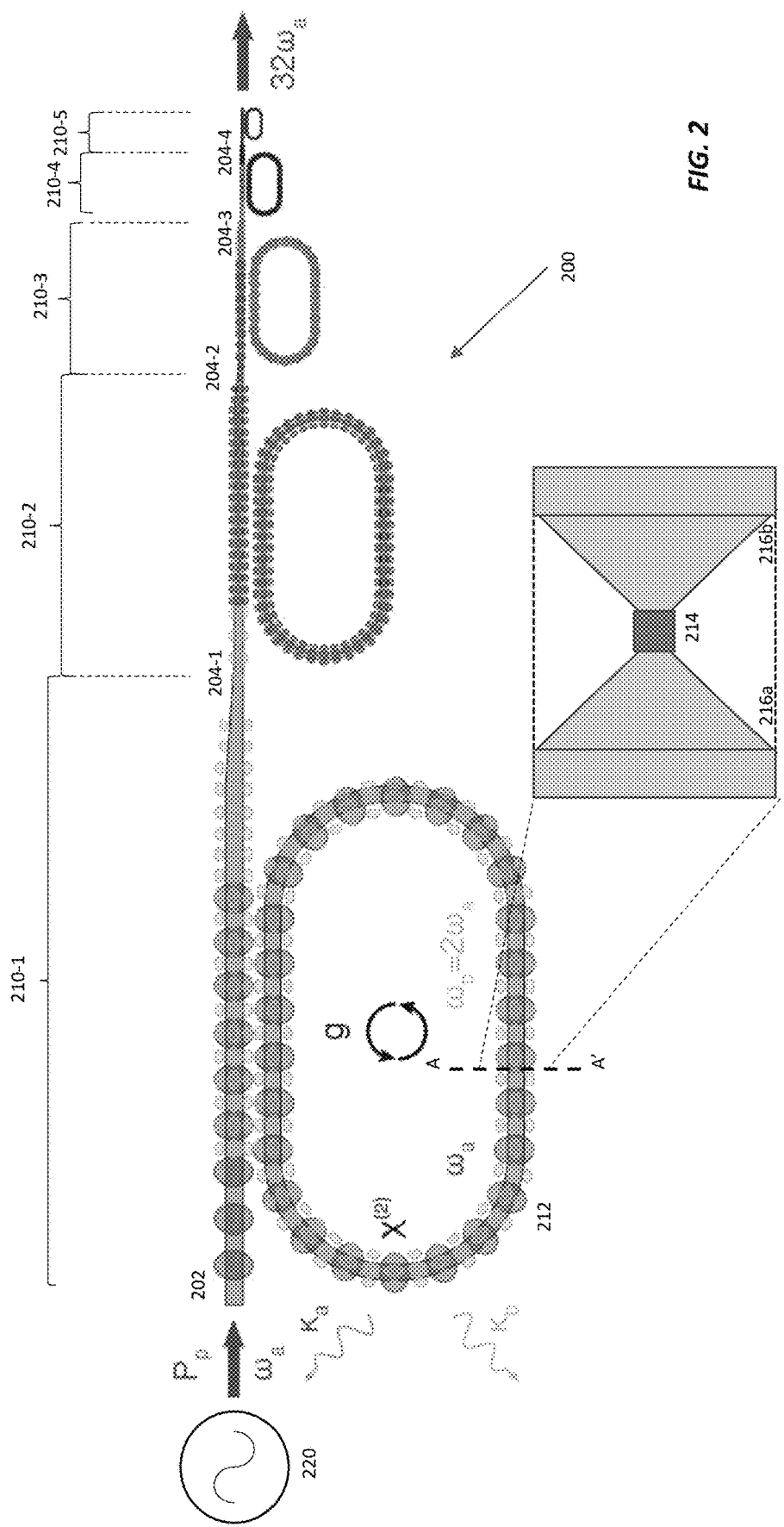
FIG. 2 shows a terahertz frequency synthesizer that includes cascaded ring-resonator crystal parametric frequency converters with nonlinear material sandwiched between field-concentrating, doubly resonant ring resonators.

FIG. 2 illustrates a frequency synthesizer 200 that includes cascaded parametric converters 210-1 through 210-2 that generate an output at a frequency of $32\omega_a$ from an input at a frequency of $\omega_a$ (e.g., 100 GHz) and a power $P_a$ (e.g., 1-4 W). This input is provided by an electronic seed oscillator 220 coupled to the input of the first parametric converter 210-1. The first parametric converter 210-1 generates an output at a frequency of $2\omega_a$. The output of the first parametric converter 210-1 is coupled to the input of the second parametric converter 210-2, which generates an output at a frequency of $4\omega_a$. Each succeeding parametric converter is coupled to the output of the preceding parametric converter and generates a frequency-doubled output, like the frequency synthesizer shown in FIG. 1A. In this example, there are five cascaded parametric converters 210, so the output is at a frequency of $32\omega_a$. Other ring-resonator-based frequency synthesizers may have more or fewer cascaded parametric conversion stages.

A bus waveguide 202 receives the input from the electronic seed oscillator 220 and guides the frequency-doubled beams from each parametric conversion stage to the next parametric conversion stage and finally to the output of the frequency synthesizer 200. The bus waveguide 202 can be implemented as a rib or strip waveguide on or in a substrate (not shown). The bus waveguide's width is smoothly tapered to form couplers 204-1 through 204-4 between successive stages. Each coupler 204 couples the frequency-doubled output of the preceding stage to the succeeding stage without necessarily coupling the seed input to the preceding stage to the succeeding stage.

In each parametric converter 210, a corresponding section of the bus waveguide 202 evanescently couples the seed input to a ring cavity or ring resonator 212 that is resonant at both the input fundamental frequency (e.g., $\omega_a$) and at the output second-harmonic frequency (e.g., $2\omega_a$). Each section of the bus waveguide 202 can be single-mode at the corresponding input frequency. The inset (bottom) of FIG. 2 shows a cross section of the ring resonator 212 along line A-A'. This ring resonator 212 is fabricated by combining two separately fabricated silicon rings 216a and 216b with cross sections that are irregular hexagons. Each hexagon has two pairs of parallel sides and one pair of angled sides. The angles sides come to a near-point, separated by short, straight facet. The short straight facets of the separately fabricated rings 216a and 216b are parallel to each other and sandwich a thin ring of second-order nonlinear material 214. The pointed cross-sectional shapes and positionings of the rings 216a and 216b concentrates or confines the optical mode guided by the ring resonator 212 in the nonlinear medium 214. Again, suitable nonlinear media include GaAs, GaP, ZnTe, $LiTaO_3$, and $LiNbO_3$ and can be different for each parametric converter 210.

The shaded ovals in FIG. 2 represent the nodes of the fundamental and second-harmonic modes guided by the bus waveguide 202 and ring resonators 212 in the cascaded parametric converters 210. The fundamental and second-harmonic modes co-propagate in the ring resonators 212 and in overlapping sections of the bus waveguide 202. Because each ring resonator 212 is resonant at both the corresponding fundamental and second-harmonic frequencies, each ring resonator 212 accommodates an integer number of nodes of the corresponding fundamental and second-harmonic modes.

Arbitrary Frequency Synthesis with Parametric Converters

The frequency synthesizers in FIGS. 1A and 2 use second-harmonic generation (SHG) in sequential parametric converters to convert an input wave in the microwave or radio frequencies regime into an output wave at THz or mid-IR frequencies. Other frequency synthesizers can use parametric converters to perform sum-frequency generation (SFG or SUM), difference-frequency generation (DFG), optical parametric oscillation (OPO), or optical parametric amplification (OPA). Parametric converters that perform SHG, SFG, DFG, OPO, and/or OPA can be cascaded, or their outputs otherwise combined to synthesize a wide array of frequencies.

Figure 3A:
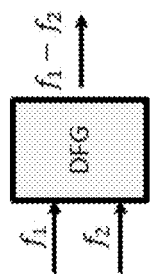
FIGS. 3A-3H illustrate how parametric converters can be used a building blocks for arbitrary frequency synthesis.
Figure 3B:
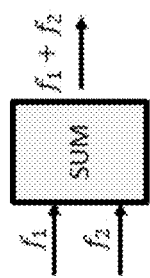
Figure 3C:
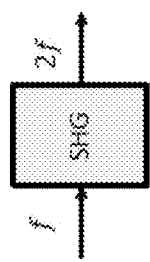
Figure 3D:
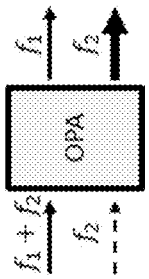
Figure 3E:
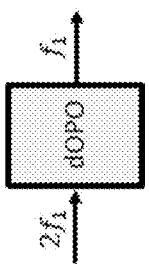
Figure 3F:
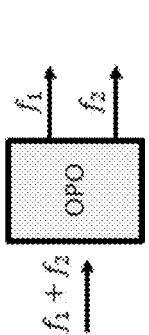
Figure 3G:
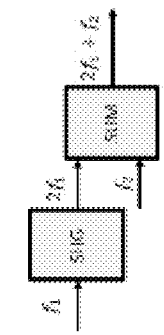
Figure 3H:
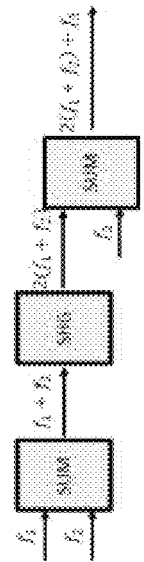

FIGS. 3A-3H show the different parametric converter types by function and examples of how they can be coupled together to generate arbitrary frequencies. Generally, if the input electromagnetic waves have frequencies of $f_1$ and $f_2$, the output electromagnetic waves can have the frequencies of $f_1$, $f_2$, $f_1+f_2$, $f_1-f_2$, $2f_1$, $2f_2$, $3f_1$, etc. FIGS. 3A and 3B show low-to-high frequency synthesis using SHG, which doubles the input frequency, and SFG, which yields an output electromagnetic wave at a frequency equal to the sum of the input frequencies, $f_1+f_2$, respectively. FIGS. 3C-3F illustrate high-to-low frequency synthesis using DFG, OPO, degenerate OPO (dOPO), and OPA, respectively. In DFG, the output wave is at frequency equal to the difference between the input frequencies, $f_1-f_2$. OPO is the reverse of SFG (non-degenerate) and SHG (degenerate). However, unlike the SFG or SHG, OPO and dOPO exhibit a threshold behavior similar to lasing. If an OPO stage does not reach its threshold, oscillation does not happen, but weak light can be generated through optical parametric generation (OPG) or optical parametric fluorescence. This weak light can be amplified using OPA. OPA is similar to OPO but with a strong seed beam. FIGS. 3G and 3H show how these different parametric converters can be arranged in series to generate arbitrary frequencies.

Parametric converters used for SFG, DFG, OPO, and OPA should have triply resonant cavities instead of doubly resonant cavities. For SFG, for example, the cavity should be resonant at both input frequencies, $f_1$ and $f_2$, and at the sum frequency, $f_1+f_2$. Similarly, the resonator in a DFG parametric converter should be resonant at $f_1$, $f_2$, and $f_1-f_2$. And non-degenerate OPO and OPA parametric converters have cavities that resonate at $f_1$, $f_2$, and $f_1+f_2$.

Second-Order Nonlinear Materials

The frequency synthesizers shown in FIGS. 1A and 2 make use of large second-order nonlinear susceptibilities derived from transverse optical phonon resonances. Transverse optical phonons can be driven by electromagnetic (EM) waves, resulting in large linear susceptibilities. The nonlinear susceptibilities are higher on resonance because they are proportional to the linear susceptibilities at the frequency components of interest. Phonon resonance frequencies lie at several THz for GaAs, GaP, and ZnTe (zinc-blendes, class $\bar{4}3m$) and for LiTaO$_3$ and LiNbO$_3$ (ferroelectrics, class 3m).

The THz nonlinear optical susceptibilities for zinc blende and ferroelectric crystals can be calculated using theoretical models supported by existing experimental data. The Faust-Henry model can be used for zinc-blende crystals and an extension of Miller's rule can be used for ferroelectric crystals. In both models, nonlinear coefficients are expressed by products of Lorentzian oscillators. The dispersion of the linear susceptibility $\chi^{(1)}=\epsilon-1=[n-(ic\alpha/2\omega)]^2-1$ (where $\epsilon$ is the relative permittivity) is calculated by the damped oscillator model.

Figure 4C:
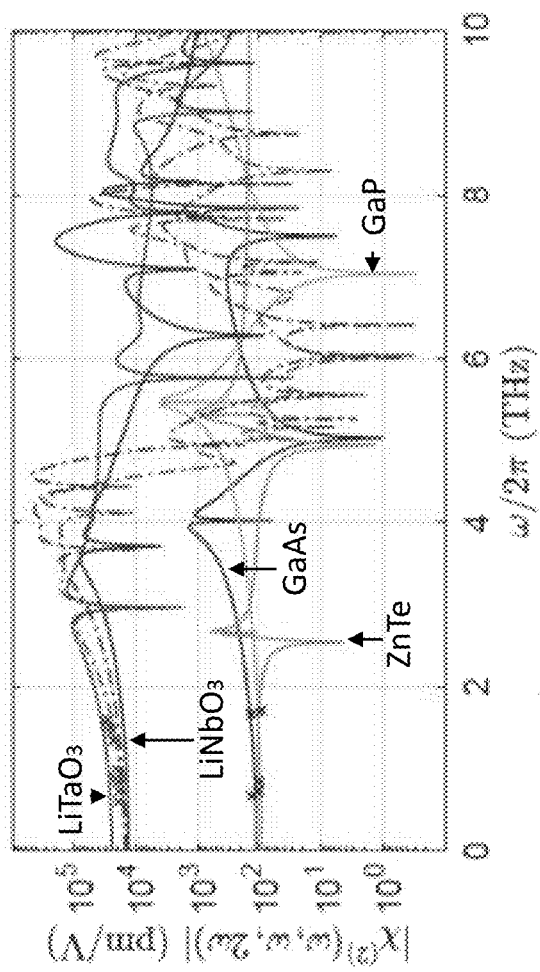
FIG. 4C is a plot of the calculated second-order susceptibility for different second-order nonlinear media.

FIGS. 4A-4D are plots of optical parameters from theoretical models along with some experimental data for GaAs, GaP, ZnTe, LiTaO$_3$, and LiNbO$_3$. FIGS. 4A and 4B are plots of the refractive index, n (extraordinary refractive index for LiTaO$_3$ and LiNbO$_3$), and absorption coefficient, $\alpha$, respectively. Although the prediction of the absorption coefficient goes to zero as the frequency goes to zero, experiments using THz time-domain spectroscopy show appreciable absorption at low frequencies due to other dissipation processes not included in the models used here.

FIG. 4C is a plot of the second-order susceptibility, $|\chi_{jkl}^{(2)}(\omega, \omega, 2\omega)|$ as a function of the fundamental frequency $\omega_a$ from 0 to 10 THz. The solid lines represent $\chi_{33}^{(2)}$ (LiTaO$_3$, LiNbO$_3$) or $\chi_{14}^{(2)}$ (GaAs, GaP, ZnTe) and the dashed lines represent $\chi_{31}^{(2)}$ (LiTaO$_3$, LiNbO$_3$). In the zinc-blende materials, the nonzero components of the nonlinear tensor $\chi_{14}^{(2)}$, $\chi_{25}^{(2)}$, and $\chi_{36}^{(2)}$ are all equal. The second-order susceptibility $\chi^{(2)}$ is plotted over half the frequency range of the refractive index and absorption coefficient since second-harmonic generation from $\omega_a$ to $2\omega_a$ depends on the refractive index and absorption coefficient at both frequencies. Crosses indicate experimental data.

Figure 4D:
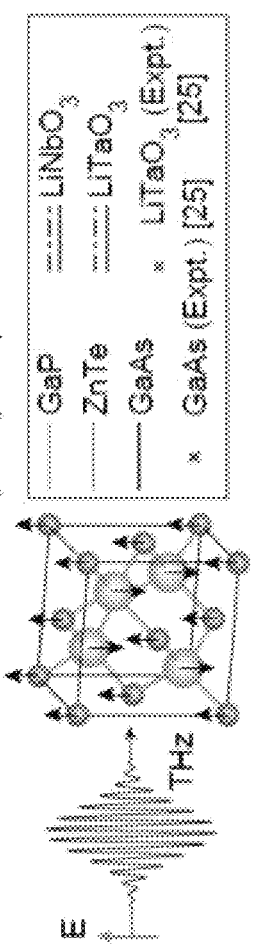
FIG. 4D shows the transverse optical phonon mode excited by an incident THz field.

FIG. 4D illustrates the transverse optical phonon mode excited by an incident THz field. When either the fundamental or second harmonic mode lies near the transverse optical phonon frequency, the nonlinear susceptibility rapidly rises due to the resonance. The first maximum appears at half the lowest transverse optical phonon frequency, for example, at about 4.0 THz in GaAs. A second peak occurs at about 8.0 THz, coinciding with the resonant features in the index and absorption coefficient in FIGS. 4A and 4B.

FIGS. 4A-4C indicate that these phonon resonances result in remarkably high THz nonlinear susceptibilities for LiTaO$_3$ and LiNbO$_3$ of over $10^4$ pm/V, exceeding their values in the optical range by around three orders of magnitude ($\chi_{33}^{(2)}=-40$ and $-60$ pm/V, respectively, for LiTaO$_3$ and LiNbO$_3$). GaAs, GaP, and ZnTe also show an order of magnitude increase relative to their optical counterparts ($\chi_{14}^{(2)}=268$, 156, and 139 pm/V, respectively, for GaAs, GaP, and ZnTe). Measurements of the second-order susceptibility in FIG. 4C at THz frequencies in GaAs and LiTaO$_3$ agree with the calculated predictions.

The large $\chi^{(2)}$ coefficients are accompanied by high absorption losses, as shown in FIG. 4B. As such, standard cavity designs using a single material do not benefit from the second-order susceptibility due to the strong linear absorption. To overcome the loss, we introduce hybrid cavity designs in which the nonlinear materials are embedded in a low-loss dielectric, e.g., high-resistivity Si. This allows us to take advantage of the second-order susceptibility at lower material losses.

Cavity Designs

Dielectric photonic crystal cavities with tip structures like those in FIGS. 1A-1I exhibit strong field confinement and high quality factors. These tip structures are at the anti-node of a cavity mode, resulting in extreme field enhancement at the dielectric tip. For more on these tip structures, see to-be-published U.S. application Ser. No. 16/878,046, which is incorporated herein by reference.

Here, we apply this field concentration principle to the THz regime to design hybrid-material photonic crystal and ring cavities with large SHG conversion efficiency. Both cavity types have unique benefits and challenges; photonic crystal cavities have smaller mode volume and are insensitive to phase matching; ring cavities should be phase-matched but have radiation quality factors that are less sensitive to imperfections and are easier to couple to a waveguide without modification.

Figure 5A:
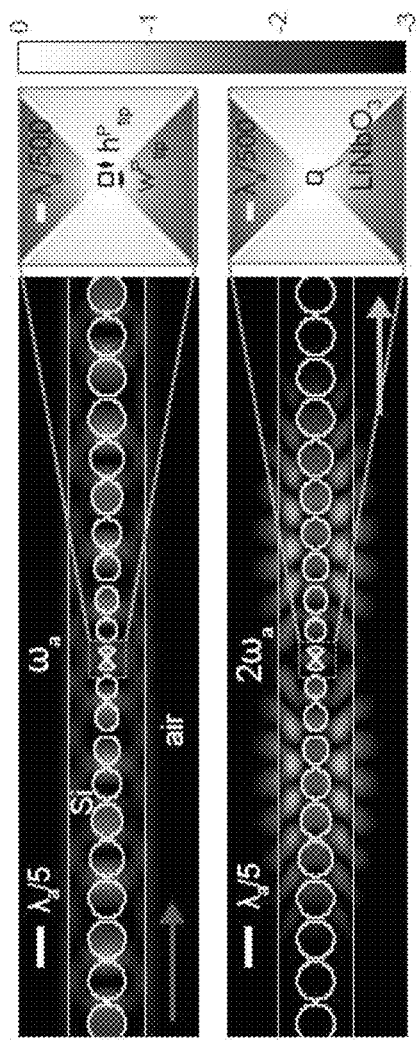
FIG. 5A shows the field profiles of fundamental and second-harmonic in a photonic crystal cavity parametric converter.

FIGS. 5A-5F illustrate cavity modes and scaling behavior in photonic crystal cavities and ring resonators. FIG. 5A shows a plan view of field profiles ($\log_{10} |E/E_{max}|^2$) of transverse electric (TE) modes of a photonic crystal cavity at a fundamental frequency $\omega_a$=331 GHz (top) and a second-harmonic frequency $\omega_b$=662 GHz (bottom). Like the photonic crystal cavity in FIG. 1A, the holes photonic crystal cavity in FIG. 5A have holes with tapering radii in a rectangular silicon waveguide. These holes form a distributed Bragg reflector centered on a central hole with LiNbO$_3$ between a pair of field-concentrating tips. The thickness of the photonic crystal cavity (out of the plane of FIG. 5A) is about $0.32\lambda_a$. The full cavities (left) and close-ups of the nonlinear tips (right) are shown. Scale-bars are $\lambda_a/5$ ($\lambda_a/500$ for the close-ups).

Figure 5B:
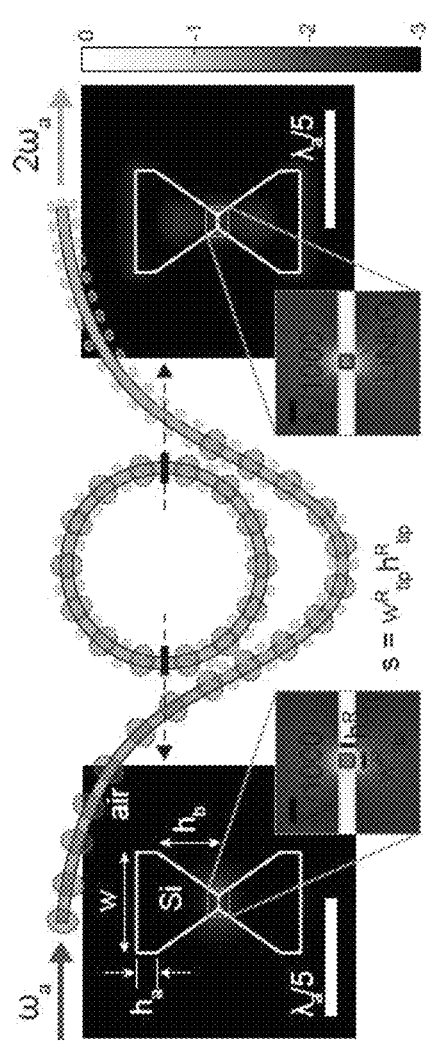
FIG. 5B shows the field profiles of fundamental and second-harmonic in a ring resonator parametric converter.

FIG. 5B shows both a plan view (center) and cross-sectional views (left and right) of field profiles in a ring resonator at a fundamental frequency $\omega_a$=350 GHz (left) and a second-harmonic frequency $\omega_b$=700 GHz (right). The insets at left and right show close-ups of nonlinear tips in the cross-sections. The scale-bars in FIG. 5B are the same as in FIG. 5A. Interferometric coupling can be used for tuning of the coupling quality factor to optimize the conversion efficiency. Like the ring resonator in FIG. 2, the ring resonator in FIG. 5B can be fabricated by combining two separately fabricated silicon rings with angled cross sections, where one ring has a thin layer of LiNbO$_3$ on top of the silicon.

The ring cavity in FIG. 5B uses the $\chi_{33}^{(2)}$ component to couple the fundamental transverse magnetic (TM) mode at the fundamental frequency and a higher order TM mode at second-harmonic frequency. To couple the two TM modes by the $\chi_{14}^{(2)}$ component in the zinc-blende materials, the dominant electric field component should be aligned to the [111] crystal axis, in which case $\chi_{eff}^{(2)}=(2/\sqrt{3})\chi_{14}^{(2)}$. The ring cavity achieves phase matching by the condition on the angular wavenumber, $m_b-2m_a=0$. Selecting the ring radius such that the ring is resonant at the frequencies $\omega_a$ and $\omega_b=2\omega_a$ for which the effective indices of the waveguide are equal fulfills the energy matching condition. The mode field profiles in FIG. 5B were computed using the commercial 2D Finite Difference Eigenmode (FDE) solver Lumerical MODE and the open-source software MPB. At $\omega_a$=350 GHz, the dimensions of the ring resonator cross section in FIG. 5B are w=150 µm, $h_a$=30 µm, and $h_b$=91.8 µm, $w_{br}$=20 µm, $w_{tip}$=625 nm, and $h_{tip}$=625 nm.

FIGS. 5C-5F illustrate how these hybrid cavity designs enable large SHG conversion efficiency using the ring cavity in FIG. 5B as an example where the ring cavity host material (Si) is taken to be lossless. FIG. 5C is a plot of the maximum SHG efficiency with cross-sectional area s of the nonlinear material in the ring resonator, for conversion from 350 GHz to 700 GHz as in FIG. 5B. FIG. 5D is a plot of the normalized electric field energy in the tip versus the cross-sectional area of the nonlinear material. FIG. 5E is a plot of the material quality factor versus the cross-sectional area of the nonlinear material. And FIG. 5F is the squared magnitude of normalized nonlinear overlap, calculated for a ring radius of 3.6 la versus the cross-sectional area of the nonlinear material.

The insets in FIGS. 5A and 5B show that the nonlinear material is embedded only near the tip where both cavity modes have a high electric energy density. As shown in FIG. 5C, the SHG conversion efficiency increases as the area of the nonlinear medium decreases. FIG. 5D shows that the normalized square electric field in the nonlinear tip region increases with decreasing nonlinear material volume, the material quality factor increases, as plotted in FIG. 5E. The material quality factor in FIG. 5E increases by the inverse of the fraction of energy concentrated in the nonlinear material. The nonlinear mode overlap decreases with nonlinear material volume (see FIG. 5F), but the SHG conversion efficiency increases since it is proportional to the quality factor cubed. This increase saturates when the total quality factor becomes limited by coupling or radiation loss.

Phase Matching in Ring Cavities

For maximum conversion efficiency, a ring resonator should be both phase-matched and doubly resonant at the fundamental and second-harmonic frequencies. For two resonant frequencies of the ring, $\omega_{a(b)}$, the resonance condition is:

$$\omega_{a(b)} = \frac{m_{a(b)}}{Rn_{eff}(\omega_{a(b)}, R)},$$

where $m_{a(b)}$ is an integer that enumerates the azimuthal modes of the ring resonator, R is the radius of the ring resonator, and $n_{eff}(\omega_{a(b)}, R)$ is the effective index of the waveguide. With $\omega_b=2\omega_a$, the phase-matching condition $m_b=2m_a$ is satisfied when the effective indices of the fundamental and second harmonic modes are equal to each other, $n_{eff}(\omega_a, R)=n_{eff}(2\omega_a, R)$.

Figures 6A, 6B, 6C:
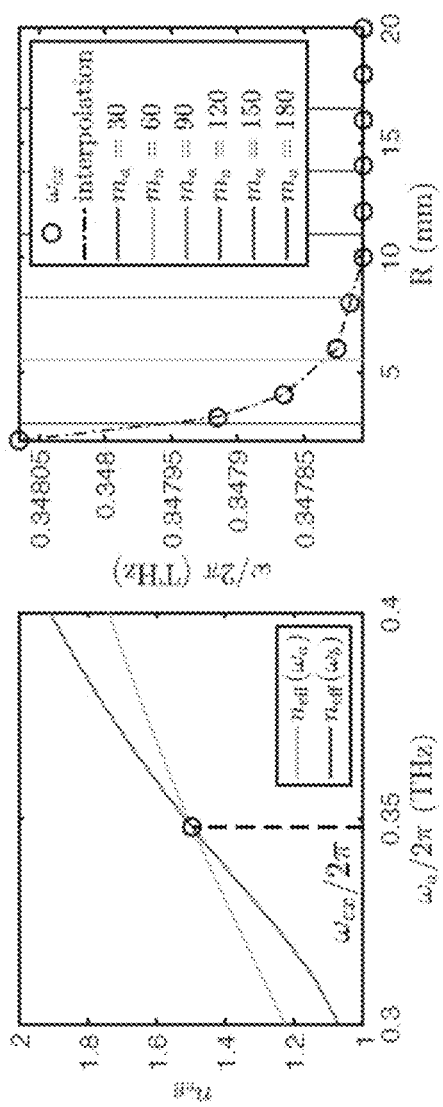
FIG. 6A is a plot the effective indices of the fundamental and second harmonic modes as a function of the fundamental frequency and radius of a ring resonator.
FIG. 6B is a plot of the crossover frequency versus radius for a ring resonator (vertical lines indicate double resonances for different mode numbers).
FIG. 6C is a plot the fundamental and second-harmonic quality factor as a function of the radius of a ring resonator.

FIG. 6A shows the effective indices of the fundamental and second harmonic modes calculated as a function of the fundamental frequency and ring resonator radius using a finite difference eigenmode solver. The waveguide parameters are adjusted such that the effective indices of the fundamental and second-harmonic modes are equal at a crossover frequency $\omega_a=\omega_{cx}$, shown in FIG. 6A for LiNbO$_3$ near 350 GHz. As the ring resonator radius is reduced, the crossover frequency $\omega_{cx}$ increases, as plotted in FIG. 6B. Where $\omega_{cx}$ intersects with one of the ring resonances (vertical lines in FIG. 6B), the ring resonator is simultaneously resonant and phase-matched at both frequencies. If the crossover frequency and effective index are well-behaved functions, they can be interpolated to find appropriate radii for ring resonance.

FIG. 6C is a plot of the radiation quality factor $Q_{a(b)}^r$ versus ring radius for the fundamental (lower trace) and second-harmonic (upper trace) modes in a ring resonator. Radiation loss limits the ring radius. The radiation quality factor is calculated from the imaginary part of the modal effective index. FIG. 6C shows the minimum radius that is compatible with a radiation quality factor of at least $10^6$. Considering this and the phase-matching condition, a suitable radius for a silicon ring resonator is 3.2 mm for converting a 350 GHz input mode into a 700 GHz output mode. Summing the radiation quality factor, coupling quality factor, and material quality factor yields the ring resonator's overall quality factor, which can be used to compute the SHG efficiency.

Conversion Efficiencies

Figure 7B:
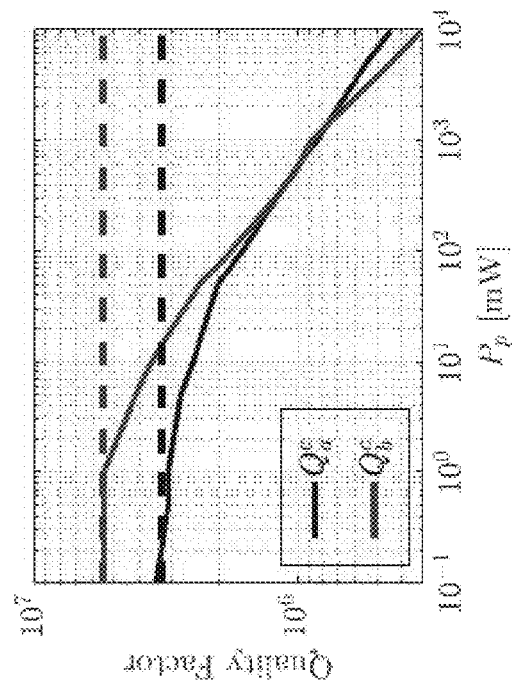
FIG. 7B is a plot of the overall quality factor versus input power for a ring resonator with GaP nonlinear material.
Figure 7A:
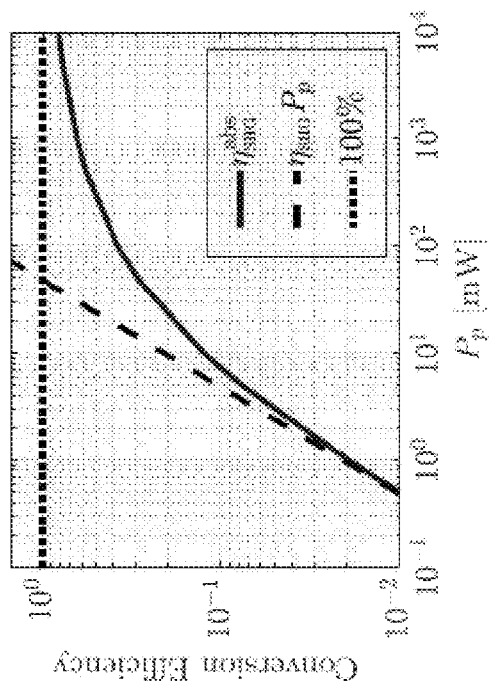
FIG. 7A is a plot of the conversion efficiency versus input power for a ring resonator with GaP nonlinear material.

FIGS. 7A and 7B illustrate the conversion efficiency and quality factor, respectively, versus input power for the ring resonator parametric converter design shown in FIGS. 2 and 5B with GaP at the nonlinear material at a fundamental frequency of 1385 GHz. The diagonal dashed line in FIG. 7A represents the product of the input power and the absolute SHG efficiency. The horizontal dotted line in FIG. 7A represents 100% conversion efficiency. The conversion efficiency product asymptotically approaches the absolute conversion efficiency at low input power and 100% conversion efficiency at high input power. The parameters used to calculate the conversion efficiency in FIG. 7A are: $Q_a^r=6.0\times10^6$, $Q_b^r=2.0\times10^{13}$, $Q_a^m=7.3\times10^6$, $Q_b^m=5.5\times10^6$, $n_a=3.32$, and $\chi_{eff}^{(2)}=1.0\times10^{-10}$ m/V.

To calculate the power at the output each parametric conversion stage of a cascaded SHG frequency synthesizer, we first calculate the absolute SHG conversion as a function of input power at each frequency for the different nonlinear materials. At each frequency, the material providing the highest conversion efficiency is chosen for use in the corresponding parametric conversion stage and the output power of that stage becomes the input power at the next stage of the cascade.

Figure 8A:
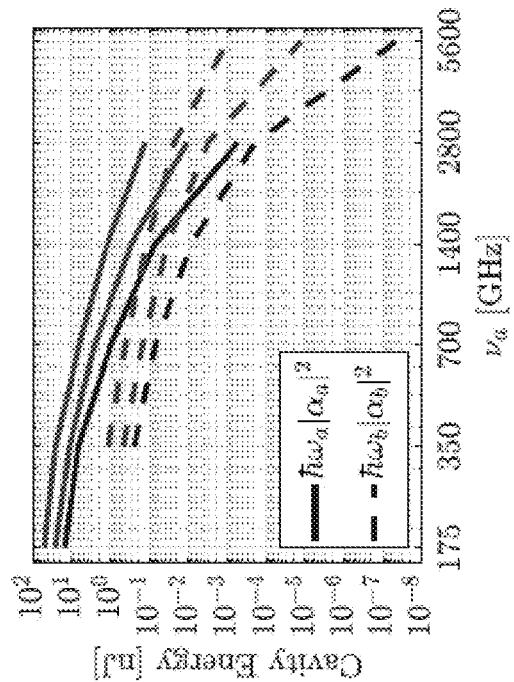
FIG. 8A is a plot of output power versus fundamental frequency for cascaded photonic-crystal parametric converters.
Figure 8B:
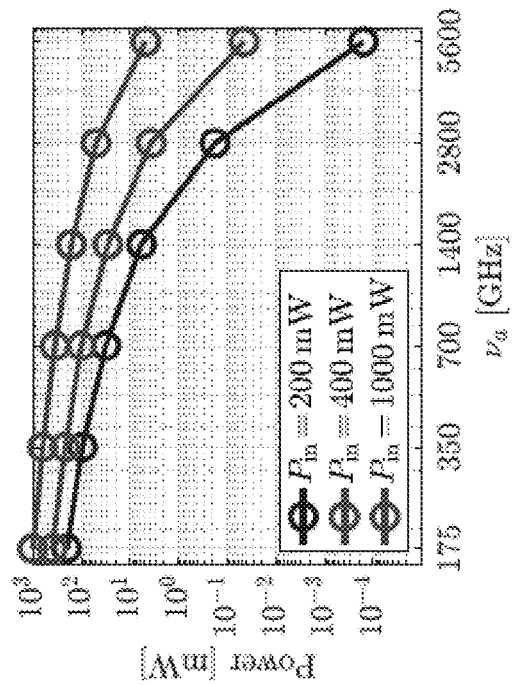
FIG. 8B is a plot of cavity energy versus fundamental frequency for cascaded photonic-crystal parametric converters.

FIGS. 8A and 8B show one example of cascading using the best possible photonic-crystal parametric converter at each frequency. FIG. 8A is a plot of the output power as a function of frequency for input powers of 200 mW (bottom trace), 400 mW (middle trace), and 1000 mW (top trace). FIG. 8B is a plot of the intra-cavity energy corresponding to the output powers in FIG. 8A, with the same ordering of traces. Each circle in FIGS. 8A and 8B represents another parametric conversion stage in the cascade. Solid and dashed lines in FIG. 8B plot the energy in the fundamental and SH modes, respectively. The coupling quality factors are found by maximizing the absolute conversion efficiency as described above with respect to FIGS. 7A and 7B.

Figure 9B:
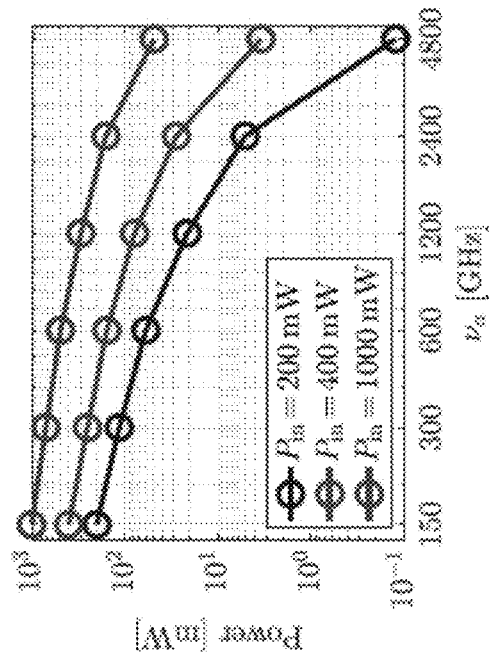
FIG. 9B is a plot of cavity energy versus fundamental frequency for cascaded ring-resonator parametric converters.
Figure 9A:
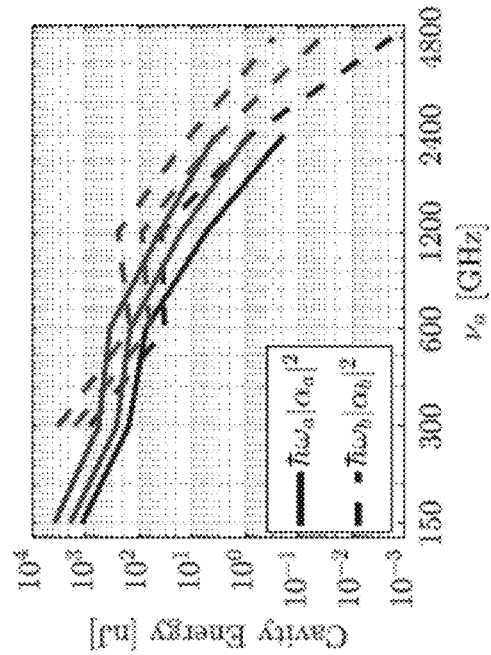
FIG. 9A is a plot of output power versus fundamental frequency for cascaded ring-resonator parametric converters.

FIGS. 9A and 9B show one example of cascading using the best possible ring-resonator parametric converter at each frequency. FIG. 9A is a plot of the output power as a function of frequency for input powers of 200 mW (bottom trace), 400 mW (middle trace), and 1000 mW (top trace). FIG. 9B is a plot of the intra-cavity energy corresponding to the output powers in FIG. 9A, with the same ordering of traces. Solid and dashed lines in FIG. 8B plot the energy in the fundamental and SH modes, respectively. Again, the coupling quality factors are found by maximizing the absolute conversion efficiency as described above with respect to FIGS. 7A and 7B.

Figure 10:
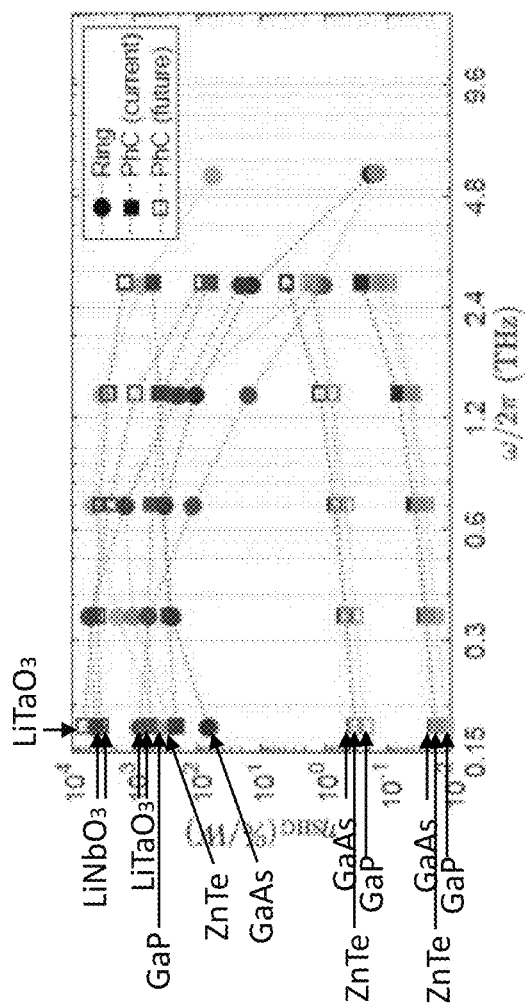
FIG. 10 is a plot of the maximum second harmonic generation efficiency versus doubling frequency for cascaded parametric converters with different ring and photonic crystal cavities.

FIG. 10 is a plot of the maximum THz SHG conversion efficiencies in the nondepleted pump regime for parametric converters with different designs in silicon host materials and different nonlinear materials. For the photonic crystal (PhC) design, FIG. 10 also shows projected efficiencies for improved radiation quality factor. The photonic crystal cavities have a nonlinear material volume small enough for the overall quality factor to be limited by radiation loss, and ring cavities have overall quality factors limited largely by material loss. The radiative quality factors at the fundamental and second-harmonic frequencies for the current (future) photonic-crystal cavities are 358,000 and 41,600 (10⁶ and 10⁵), respectively. For the photonic-crystal cavities, the cross-sectional area of the nonlinear medium is 1 µm by 1 µm for 331 GHz and inversely proportional to the square of the frequencies. The cross-sectional area of the nonlinear medium for the ring cavities is 100 nm by 100 nm across all frequencies, which is achievable with standard photolithography while being large enough relative to the lattice constants to treat the material as a continuous medium for simulation purposes. For simplicity, we ignore the index dispersion, considering instead the dispersion of loss and nonlinear coefficients.

The conversion efficiencies are above $10^3$%/W for the current designs across most of the THz gap, indicating near-unity conversion efficiencies with input powers on the order of 100 mW or higher. Analysis of the absolute conversion efficiency (depleted pump regime) provides the output power at each stage of the cascaded process.

Dielectric Breakdown

Due to the strong field confinement of the cavity designs, it is useful to consider the limitations imposed by dielectric breakdown. To evaluate the field strength in the cavities, re-normalize the eigenmodes as:

$$\vec{\mathcal{E}}_n(\vec{r}) \equiv \vec{E}_n(\vec{r})\sqrt{\frac{\hbar\omega_n|\alpha_n|^2}{\int\epsilon_0\epsilon(\vec{r})|\vec{E}_n(\vec{r})|^2 dV}},$$

where $\hbar\omega_n|\alpha_n|^2$ is the energy in cavity mode n. This re-normalized field accounts for the electromagnetic energy in the cavity, $$\int \epsilon_0\epsilon(\vec{r})|\vec{\mathcal{E}}_n(\vec{r})|^2 dV = \hbar\omega_n|\alpha_n|^2,$$

and provides the electric field in SI units of V/m. Comparison of the maximum electric field in each cavity material with the dielectric strength of the corresponding material provides the limit on the input power given by dielectric breakdown.

FIGS. 10A-10C and 11A-11C show the maximum field strength in V/m for the different materials in photonic-crystal and ring-resonator parametric converters, respectively. Each plot shows the field strength in a different material (silicon, air, or nonlinear material) corresponding to the intra-cavity energies in FIGS. 8B and 9B for input powers of 200 mW (bottom traces), 400 mW (middle traces), and 1000 mW (top traces). FIGS. 10B and 11B show the field strength in the air near the tips exceeds the breakdown field of $3\times10^6$ V/m; operating the device in vacuum would shift the consideration onto the waveguide materials.

FIGS. 10A and 11A show that the maximum electric field in the silicon waveguides peaks near $1\times10^8$ V/m in the photonic crystal and $7\times10^8$ V/m in the ring, and that in the nonlinear material peaks near $5\times10^7$ V/m in the photonic crystal (lithium niobate) and $9\times10^7$ V/m in the ring (gallium phosphide), for 1 W of input power from the seed oscillator. For comparison, gallium phosphide exhibits a breakdown field of $1\times10^8$ V/m, while bulk lithium niobate can tolerate THz field strengths of over $1\times10^8$ V/m without breakdown, and possibly higher fields for the small tip gaps considered here—well above the maximum field strengths calculated in the nonlinear materials. Silicon, on the other hand, has a theoretical intrinsic breakdown field of $8\times10^7$ V/m (independent of electrode separation), making it the limiting material in these examples. Dielectric breakdown can be circumvented by using materials with higher breakdown fields (e.g., diamond, with a breakdown field strength of $2\times10^9$ V/m), increasing the cavity size, and compensating losses by coherently combining outputs between stages of the cascade. Such modifications could allow operation at input powers exceeding 1W, improving the overall cascaded conversion efficiency.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A system for frequency synthesis, the system comprising:
 a series of cascaded parametric converters comprising:
  a first parametric converter to convert a field at a first frequency into a field at a second frequency higher than the first frequency; and
  a second parametric converter, fed by the first parametric converter, to convert the field at the second frequency into a field at a third frequency higher than the second frequency,.
 wherein the first parametric converter comprises:
  a dielectric cavity simultaneously resonant at the first frequency and the second frequency;
  a second-order nonlinear material, disposed in the dielectric cavity, to convert the field at the first frequency into the field at the second frequency; and
  a field concentrator to concentrate the field at the first frequency in the second-order nonlinear material.

2. The system of claim 1, wherein the dielectric cavity is a photonic-crystal cavity, the field concentrator comprises a pair of tips formed in the photonic crystal cavity, and the second-order nonlinear material is disposed between the pair of tips.

3. The system of claim 1, wherein the dielectric cavity is a ring resonator comprising a first ring and a second ring on opposite sides of the second-order nonlinear material.

4. The system of claim 1, wherein the second-order nonlinear material has a cross-sectional area of no more than 1 $\mu m^2$.

5. The system of claim 1, wherein the third frequency is double the second frequency and the second frequency is double the first frequency.

6. The system of claim 1, wherein the third frequency is at least 0.1 THz.

7. The system of claim 1, further comprising:
a signal generator, in connection with the first parametric converter, to generate the field at the first frequency.

8. The system of claim 1, further comprising:
a waveguide, in electromagnetic communication with the first parametric converter and the second parametric converter, to couple the field at the second frequency from the first parametric converter to the second parametric converter.

9. A system for frequency synthesis, the system comprising:
a series of cascaded parametric converters comprising:
a first parametric converter to convert a field at a first frequency into a field at a second frequency higher than the first frequency; and
a second parametric converter, fed by the first parametric converter, to convert the field at the second frequency into a field at a third frequency higher than the second frequency; and
a waveguide, in electromagnetic communication with the first parametric converter and the second parametric converter, to couple the field at the second frequency from the first parametric converter to the second parametric converter,
wherein the first parametric converter comprises a first photonic crystal cavity simultaneously resonant at the first frequency and the second frequency, the second parametric converter comprises a second photonic crystal cavity simultaneously resonant at the second frequency and the third frequency, and the first parametric converter comprises a distributed Bragg reflector configured to reflect radiation at the first frequency and to transmit radiation at the second frequency.

10. A method of frequency synthesis, the method comprising:
at a first parametric converter in a series of cascaded parametric converters, converting a field at a first frequency into a field at a second frequency higher than the first frequency;
coupling the field at the second frequency from the first parametric converter to a second parametric converter in the series of cascaded parametric converters; and
at the second parametric converter, converting the field at the second frequency into a field at a third frequency higher than the second frequency, wherein converting the field at the first frequency into the field at the second frequency higher comprises:
coupling the field at the first frequency into a dielectric cavity simultaneously resonant at the first frequency and the second frequency; and concentrating the field at the first frequency in a second-order nonlinear material that converts the field at the first frequency into the field at the second frequency.

11. The method of claim 10, wherein the field at the third frequency is phase-locked to the field at the second frequency and to the field at the first frequency.

12. The method of claim 10, wherein converting the field at the first frequency into the field at the second frequency comprises generating a second harmonic of the field at the first frequency.

13. The method of claim 10, wherein converting the field at the first frequency into the field at the second frequency comprises mixing the field at the first frequency with another field.

14. The method of claim 10, further comprising:
generating the field at the first frequency with a frequency-stabilized signal generator.

15. A system of claim 1 for frequency synthesis, the system comprising:
a series of cascaded parametric converters comprising:
a first parametric converter to convert a field at a first frequency into a field at a second frequency higher than the first frequency; and
a second parametric converter, fed by the first parametric converter, to convert the field at the second frequency into a field that is at a third frequency higher than the second frequency and that is coupled to a third parametric converter in the series of cascaded parametric converters,
wherein the series of cascaded parametric converters comprises N cascaded parametric converters, where N is an integer greater than 2, and
wherein the second parametric converter comprises:
a photonic crystal cavity simultaneously resonant at the second frequency and the third frequency;
a second-order nonlinear material, disposed in the photonic crystal cavity, to convert the field at the first frequency from the first parametric converter into the field at the third frequency; and
a field concentrator to concentrate the field at the second frequency in the second-order nonlinear material.

16. The system of claim 15, wherein N is at least 5.

17. The system of claim 15, wherein an output of the series of N cascaded parametric oscillators is at a frequency of 0.1 THz to 10 THz.

18. The system of claim 15, further comprising:
a phase-stable electronic oscillator, operably coupled to an input of the series of N cascaded parametric converters, to couple an input wave into the series of N cascaded parametric converters at a frequency of 10-100 GHz.

19. The system of claim 15, wherein the third frequency is twice the second frequency and the second frequency is twice the first frequency.

* * * * *

UNITED STATES PATENT AND TRADEMARK OFFICE
CERTIFICATE OF CORRECTION

| | |
|---|---|
| PATENT NO. | : 11,448,939 B2 |
| APPLICATION NO. | : 17/384861 |
| DATED | : September 20, 2022 |
| INVENTOR(S) | : Hyeongrak Choi and Dirk Robert Englund |

It is certified that error appears in the above-identified patent and that said Letters Patent is hereby corrected as shown below:

In the Claims

• Column 18, In Claim 16, Line 42, replace "wherein Nis at" with -- wherein N is at --

Signed and Sealed this
Sixth Day of December, 2022

Katherine Kelly Vidal
*Director of the United States Patent and Trademark Office*